United States Patent [19]
Rich et al.

[11] Patent Number: 4,771,444
[45] Date of Patent: Sep. 13, 1988

[54] SCINTILLATION MULTIPLEXER

[75] Inventors: Arthur Rich; Bernard W. Agranoff, both of Ann Arbor, Mich.

[73] Assignee: The University of Michigan, Ann Arbor, Mich.

[21] Appl. No.: 906,173

[22] Filed: Sep. 11, 1986

[51] Int. Cl.[4] .................................... G01T 1/208
[52] U.S. Cl. ................................ 377/20; 377/10; 250/328
[58] Field of Search ................. 377/10, 20; 250/328

[56] References Cited

U.S. PATENT DOCUMENTS

| | | | |
|---|---|---|---|
| 3,723,736 | 3/1973 | Lawey | 250/328 |
| 3,906,230 | 9/1975 | Hagen | 250/336 |
| 3,984,690 | 10/1976 | Marshall, III et al. | 250/374 |
| 4,001,589 | 1/1977 | Airma et al. | 250/336 |
| 4,131,798 | 12/1978 | Reddy et al. | 250/328 |
| 4,187,428 | 2/1980 | Pochwalski et al. | 250/328 |
| 4,206,504 | 6/1980 | Frey | 377/10 |
| 4,303,410 | 12/1981 | Copeland | 23/230 |

Primary Examiner—John S. Heyman
Attorney, Agent, or Firm—Rohm & Monsanto

[57] ABSTRACT

A liquid scintillation counter system utilizes multiplexing to achieve monitoring of a plurality of scintillation samples using relatively few sensors, such as photomultiplier tubes, each such photomultiplier tube, in a specific embodiment, receiving light generated by scintillation events in a plurality of the scintillation samples. Each scintillation sample, which may be contained in a vial, is coupled by means of light guides to at least two of the photomultipler tube. Some background noise is eliminated by use of discriminators which establish a predetermined threshold level for the magnitude of the outputs of the photomultipler tube, above which the pulses are countable. Coincident circuitry is used to determine the presence of a scintillation event, and thereby issue a coincidence pulse which is counted. In accordance with the invention, n photomultiplier tubes can be used to monitor $(n/2)(n-1)$ samples.

19 Claims, 3 Drawing Sheets

SCINTILLATION MULTIPLEXER

BACKGROUND OF THE INVENTION

This invention relates generally to multiplexing systems, and more particularly to a scintillation monitoring system wherein a predetermined number of light sensors monitor and count scintillation events in a greater number of scintillation samples.

Liquid scintillation counting of low level radioactivity is commonplace in laboratories where pharmacological, biochemical, or molecular biological research is conducted. In addition, such scintillation monitoring systems are found in hospitals and clinics which perform laboratory tests as part of clinical procedures. In a typical scintillation monitoring arrangement, scintillation counters automatically count between one hundred and three hundred sequential samples each for a time period typically between one and twenty minutes. Counting is generally performed for a predetermined period of time, or a predetermined number of counts, or some variation of these two limits. In either case, statistical fluctuations in a given sample are generally required to be lower than five percent. Assuming that Gaussian statistics are applicable to such counting, two thousand disintegrations per sample are implied.

It is a problem with known systems that they are expensive to purchase, use, and maintain. For example, typical scintillation counters cost between $15,000.00 and $30,000.00, and generally require approximately $2,000.00 per year to maintain. This requires a high rate of throughput for economic reasons. One approach to the problem of achieving high throughput is to add sufficient radioactivity to the initial reaction to achieve a high count rate in the product which is to be measured. Such highly radioactive samples, however, raise the problem of a significant addition to the cost of the laboratory procedure, possibly offsetting whatever financial gain might be derived from a shorter counting time. In addition, potential environmental hazards are produced in the laboratory as a result of usage of large amounts of radioactivity. It is highly desirable for health reasons to keep the usage of radioactivity to a minimum. In many radiolabeling procedure, only a fraction of a percent of the added radioactivity is incorporated and counted, and the remainder must be disposed of. In addition to the foregoing, it should be noted that the biohazards resulting from use of radioactivity extend beyond the laboratory. For example, longterm storage of low-level radioactive waste is receiving increased public attention. Tritium and $^{14}C$ are particular sources of concern since they have half-lives of 12 years and 5,600 years, respectively. The cost of waste disposal has escalated and may eventually become the limiting factor in biomedical research which employs radioactivty.

It is evident from the foregoing that there is a need for a scintillation monitoring system which can monitor the occurrence of scintillation events in a large number of samples simultaneously. Such a system would be particularly useful in biodistribution studies which use new radiotracer drugs, particularly for human applications. Such biodistribution studies are neccessary to see how the drug is metabolized and which organ receives the highest radiation dose. The nuclides involved may have half-lives from 2 minutes ($^{15}O$) to 20 minutes ($^{11}C$). With such short half-lives, it is necessary to inject large amounts of material so that by the time the last tissue is counted in a conventional scintillation counter, there will remain sufficient radioactivity for accurate measurement. There is a need for a counting system which will measure all tissues simultaneousely thereby obviating the need to correct for decay of the isotopes, since all samples will be decaying constantly, and the percent distribution to the various tissues will not vary during the counting period.

It is, therefore, an object of this invention to provide a simple and inexpensive system which can accommodate a broad range of scintillation sources.

It is another object of this invention to provide a simple and inexpensive scintillation monitoring system which can monitor many scintillation vials simultaneously.

It is a further object of this invention to provide a scintillation monitoring system which requires relatively few sensors, such as photomultiplier tubes, and has a high throughput.

It is an additional object of this invention to provide a scintillation monitoring arrangement which affords a reduced consumption of radioactive materials.

It is still another object of this invention to provide a system for simultaneously counting scintillation events from multiple vials at moderate cost.

It is a still further object of this invention to provide a system which is useful for multiple simultaneous short half-life experiments.

It is also an object of this invention to provide a system for which light collection efficiency can easily be measured.

It is yet another object of this invention to provide a multiplexing system which employs multiple inputs to each of a plurality of sensors and coincidence logic.

It is also another object of this invention to provide a system for monitoring 25 or more radioactive samples using less than two photodetectors per vial.

It is also a further object of this invention to provide a multiplexing sytem which utilizes relatively few sensors to monitor many samples without intolerable crosstalk interference.

It is additionally an object of this invention to provide a system which achieves high efficiency using common beta-emitting radionuclides, such as $^3H$, $^{14}C$, $^{32}P$, and $^{35}S$.

It is yet another object of this invention to provide a system which achieves high throughput without requiring high levels of radioactivity.

It is a yet further object of this invention to provide a system which facilitates in vivo biodistribution studies of short-lived isotopes.

It is additonally another object of this invention to provide a system which enables sensing of multiple labels simultaneously.

SUMMARY OF THE INVENTION

The foregoing and other objects are achieved by this invention which provides a multiplexing arrangement for monitoring simultaneously the occurrence of detectable events, such as scintillation events, in each of a plurality of samples. In accordance with the invention, a plurality of sensors receive indications of the events and produce responsive output electrical signals. Light guides are provided for coupling optically each of the samples to at least two of the sensors. Each such sensor is arranged to receive light from a plurality of the samples. The particular sample to which an event is to be attributed is determined by circuitry which determines the coincidence of light at two of the sensors.

In one embodiment of the invention, a discriminator is coupled to the output of a sensor to ensure that only output signals having a magnitude greater than a predetermined value are conducted to the coincidence-determining circuitry. Such discriminators therefore establish a minimum magnitude and serve to reduce the effect of background noise.

In a further embodiment, the discriminators are connected at their output to a coincidence monitoring arrangement which operates to cancel events. Thus, for example, if three discriminators issue output signals simultaneously in a system where the scintillation light from each sample is conducted to two sensors, then a signal is issued which cancels the event from being counted. In certain embodiments, the cancellation signal may operate to disable the coincidence-determining circuitry.

The benefits of the present invention are achieved when there are at least three sensor means. However, in embodiments where n sensors are provided, the maximum number m of sample positions which can be monitored simultaneously is defined by $(n/2)(n-1)$. Thus, in an embodiment where four sensors are provided, as many as six samples can be monitored simultaneously.

While the $(n/2)(n-1)$ equation describes the minimum number of phototubes needed for coincidence counting of a fixed number of vials, other constraints such as placement of light pipes may lead to the preferential use of additional phototubes in order to create a more compact instrument or multi-vial cassette. This invention applies to all arrays in which light from more than one vial is shared by a given phototube, resulting in less than two phototubes per vial in a simultaneous multi-vial coincidence counting instrument.

The usual method for measuring the radioactivity of liquid scintillation (LS) samples is to detect simultaneous events in each of the two photomultiplier tubes (PMT's) viewing the sample. This procedure greatly reduces the number of background events below what a single PMT would detect. The most straightforward way to increase the number of samples that can be counted at one time is to provide two PMT's for each sample. Thus, the total number of samples (m) that n detectors would count is $m = n/2$. The device described herein makes multiple use of each PMT, allowing it to view $n-1$ different samples and resulting in n detectors viewing $m = (\frac{1}{2})(n)(n-1)$ samples. Simultaneous signals in a given pair of detectors must then be electronically decoded to ascertain which sample gave rise to the event.

Two major problems will arise when a given PMT views many samples. First, the necessity of piping the light from the sample to a detector some distance away (as opposed to the close sample-detection coupling in current model LS counters) provides an opportunity for light to be lost, and consequently, the efficiency $\eta$ for detecting a given event would be decreased. Secondly, since a given PMT views more than one sample, two accidentally simultaneous events in different samples [e.g., (a,b) and (c,d)] could be recorded as an event in a third sample [e.g., (a,c)] where no real event occurred. In a standard LS counter one can measure the background rate with no sample radioactivity present and obtain an accurate measure of the total background, even with high activity in all of the other samples. The crosstalk component of the background will be absent when no radioactivity is present. In order to estimate the effect of these two problems one must first calculate the counting rate $S_{ab}$ expected for sample (a,b):

$$S_{ab} = \eta R_{ab} + B_{ab} \tag{Eq. 1}$$

Here, $R_{ab}$ is the actual decay rate of the radioisotope in sample (a,b) and $B_{ab}$ is the total background rate at position (a,b).

The detection efficiency $\eta$ is obtained by averaging the probability P(E) of detecting both signals from a $\beta$ particle of energy E. weighted by the $\beta$ energy spectrum N(E):

$$\eta = \frac{\int_0^{E_o} N(E)P(E)dE}{\int_0^{E_o} N(E)dE} \tag{Eq. 2}$$

Here, $E_O$ is the maximum energy of the $\beta$ energy spectrum and P(E) is given by $P(E) = [1 - Q(E)]^2$, where Q(E) is the probability of missing the signal from a single detector $[Q(E) = (1 - f_c Q.E.)^{\bar{\eta}}$. We define: $\bar{\eta} = C_{conv} E$ the average number of photons produced by a particle of energy E (typically, $C_{conv} = 5/KeV$), Q.E. the quantum efficiency of the PMT (typically 25%), and $f_c$ the fraction of the scintillation light which actually reaches a given detector.

The background $B_{ab}$ is composed partially of events which occured in (a,b), induced either by cosmic rays $B_{ab}^{(CR)}$ or by the natural background radioactivity of the surroundings $Ba_{ab}^{(nat)}$, and partially of the accidental coincidence of signals in PMT's a and b, unassociated with a real event in (a,b):

$$B_{ab} = B_{ab}^{(CR)} + B_{ab}^{(nat)} + \Delta T[B_a^{(DK)} + \eta_1 R_a^{(T)}][B_b^{(DK)} + \eta_1 R_b^{(T)}] \tag{Eq.3}$$

Here, $\Delta T$ (typically $10^{-8}$ sec) is the maximum time separation for two signals to be considered as coincident, $B_a^{(DK)}$ is the dark count rate in detector a (typically 20,000 CPM), $R_a^{(T)}$ is the total decay rate in all samples other than (a,b) that share detector a, and $$\eta_1 = \frac{\int_0^{E_o} N(E)[1 - Q(E)]dE}{\int_0^{E_o} N(E)dE}$$

is the single detector efficiency. If no activity is present at any sample position, the count rate will be:

$$B_{ab}^{(O)} = B_{ab}^{(CR)} + B_{ab}^{(nat)} + \Delta T B_a^{(DK)} B_b^{(DK)} \tag{Eq.4}$$

This part of the background is easily measurable, and if it were the whole background, a measurement of $B_{ab}^{(O)}$ could be used with a measurement of $S_{ab}$ and with Eq. 1 to yield an accurate value for $R_{ab}$. The presence of the crosstalk background $B_{ab}^{(CT)} \equiv B_{ab} - B_{ab}^{(O)}$ can cause measurement errors as illustrated in the following extreme example: Consider a sample at position (a,b) with activity $R_{ab}$. If all the other samples in an $n = 15$ detector arrangement ($m = 105$ samples) are high activity samples ($R_o = 20,000$ DPM), the crosstalk background will be:

$$B_b^{(CT)} = \left[ \underbrace{(n-1) R_o \eta_1 (B_a^{(DK)} + B_b^{(DK)}) \Delta T}_{1.0 \text{ CPM}} + \underbrace{(n-1)^2 R_o^2 \eta_1^2 \Delta T}_{4.0 \text{ CPM}} \right] = 5.0 \text{ CPM} \quad \text{(Eqn. 5)}$$

where $\Delta T = 10^{-8}$ sec, $\eta_1 = 55\%$, and $B_a^{(DK)} B_b^{(OK)}$ 20,000 CPM. If we use $\eta = 35\%$ with Eq. 1, we obtain the calculated decay rate compensated only for $B_{ab}^{(O)}$:

$$R_{ab}^{(0)} = \frac{S_{ab} - B_{ab}^{(0)}}{\eta} = R_{ab} + \overbrace{\frac{B_{ab}^{(CT)}}{\eta}}^{15 \text{ DPM}}$$

For most experimental situations an uncompensated 15 DPM shift in the measured activity of a sample is an acceptable error, so one response to the existence of $B_{ab}^{(CT)}$ is to limit the maximum decay rate in any sample to less than some $R_o$ (in this example, $R_o = 20,000$ DPM) which will insure that $R_{ab}^{(O)} - R_{ab} < 15$ DPM. Table 1 lists four arrangements and specifies limits on the maximum activity $R_o^{(max)}$ a sample can have and yet be assured that the shift in the measured activity induced by the crosstalk background is less than 15 DPM in all samples. A second response to this shift is to calculate $B_{ab}^{(CT)}$ from Eqn. 3 using $$R_{ax}^{(0)} = \frac{S_{ax} - B_{ax}^{(0)}}{\eta},$$

where x is any detector other than b which shares a sample with detector a to generate the sum $R_a^{(T)}$.

TABLE I

| detectors n | 4 | 10 | 15 | 20 |
|---|---|---|---|---|
| samples m | 6 | 45 | 105 | 190 |
| $R_o^{(max)}$ | 95,000 DPM | 30,000 DPM | 20,000 DPM | 15,000 DPM |

BRIEF DESCRIPTION OF THE DRAWING

Comprehension of the invention is facilitated by reading the following detailed description in conjunction with the annexed drawing, in which.

DETAILED DESDRIPTION

Figure 1:
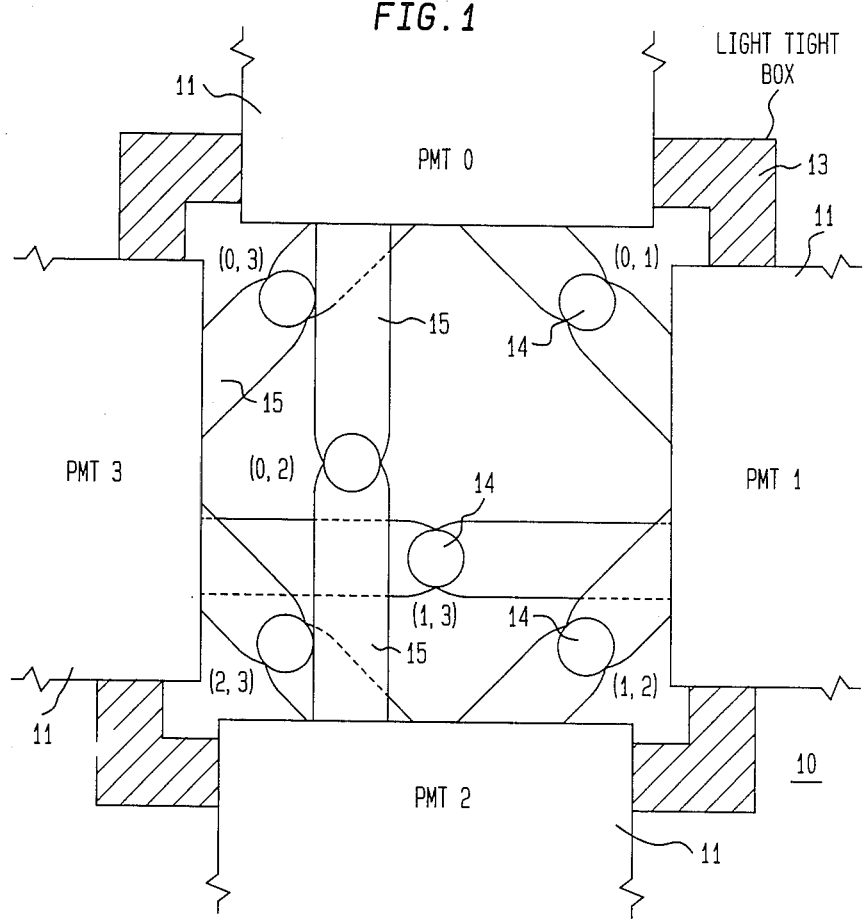
FIG. 1 is a schematic representation of a top view of a specific illustrative embodiment of the invention wherein four photomultiplier tubes monitor scintillation events in six samples.

FIG. 1 is a schematic representation of a simultaneous multivial beta counter (SMBC) 10 constructed in accordance with the principles of the invention. The specific illustrative embodiment of FIG. 1 utilizes four detectors 11, each of which is identified as a photomultiplier tube (PMT) with an associated number 0-3. Dectectors 11 are arranged, in this embodiment, in respective walls of a light tight box 13.

A plurality of light-receiving positions 14 are each coupled to a respectively associated pair of detectors 11 by means of light guides 15. Thus, any light which is emitted at light-receiving positions 14 is conduced to the associated pair of detectors by corresponding ones of the light guides. Each light-receiving position has further associated therewith in this figure a number pair which identifies the associated detector. It can further be seen in this figure that each detector, in this embodiment, receives light from a plurality of light-receiving positions.

Figure 2:
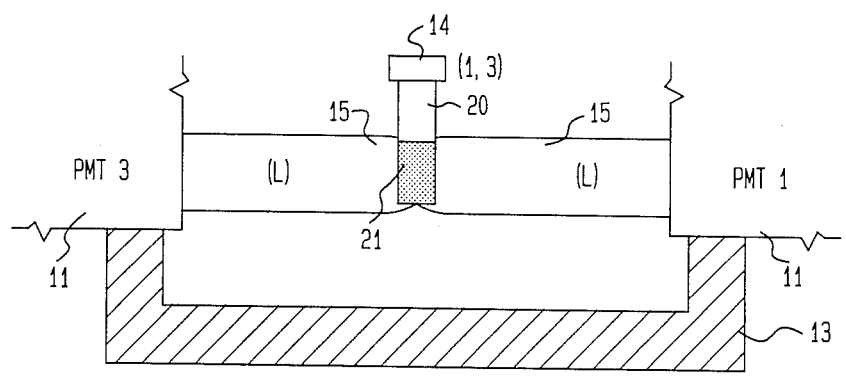
FIG. 2 is a side view of the schematic representation of FIG. 1 showing the optical coupling between a sample and two photomultiplier tubes.

FIG. 2 is a side view of the schematic representation of FIG. 1 and shows light-receiving position 14 (1,3) coupled to detectors 11 (PMT 3 and PMT 1) be light guides 15. In this figure, light-receiving position 14 is shown to be a vial 20 which has therein a scintillation sample 21. The light which is emitted from the scintillation sample by the occurrence of scintillation events is conducted through the ranslucent wall of vial 20, through light guide 15, and to PMT 3 and PMT 1.

Figure 3:
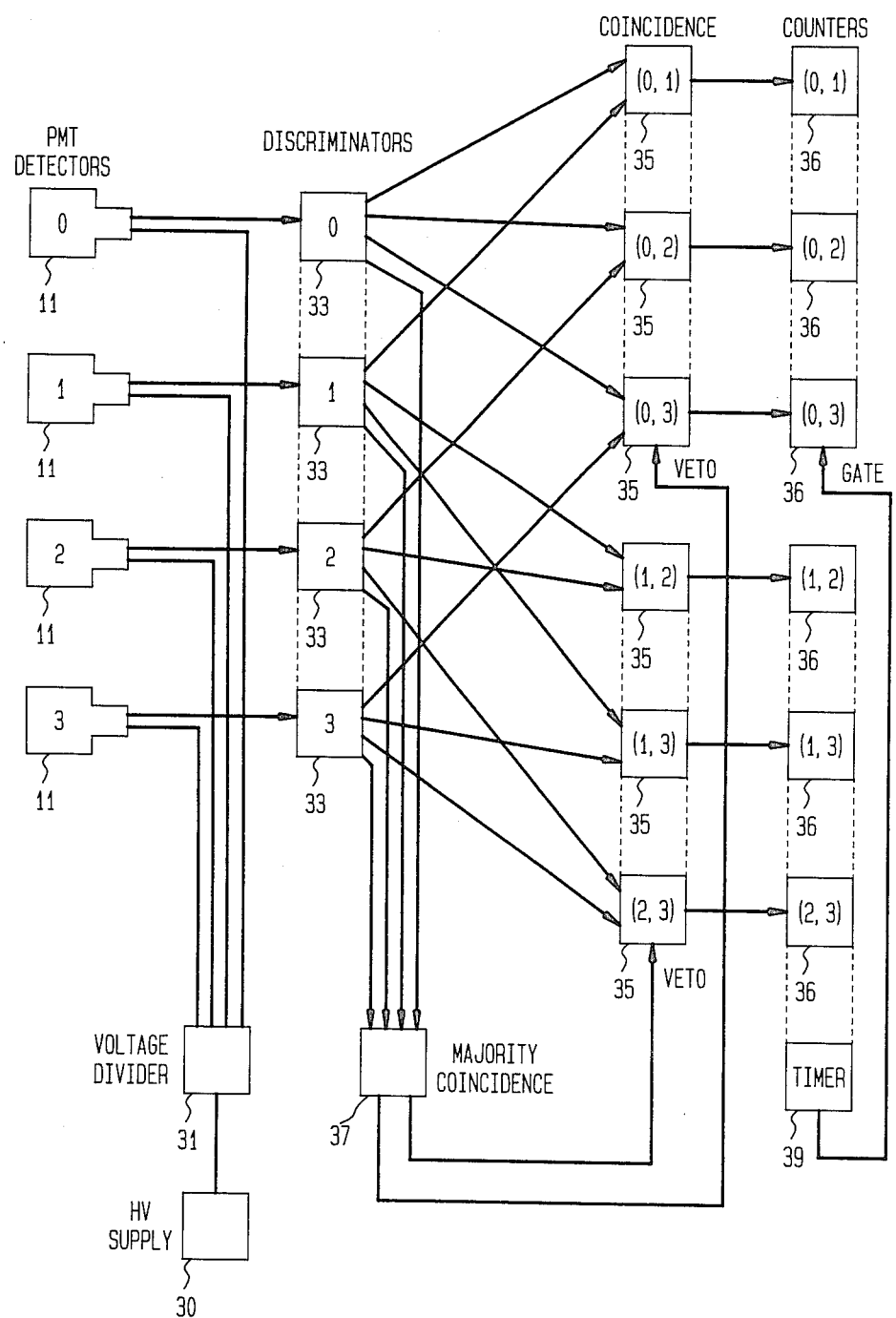
FIG. 3 is a block and line representation of decoding circuitry for use in the illustration embodiment of FIG. 1.

FIG. 3 is a block and linerepresentation of a specific illustrative embodiment of decoding circuitry which operates to count the scintillation events from the respective scintillation samples (not shown in this figure). Each of the detectors is powered by a high voltage supply 30, the voltage of which is controlled by a voltage divider arrangement 31. Each detector 11 is connected at its output to a respectively associated one of discriminators 33 which operate to roduce pulses which are their respective outputs only when thesignals from the detectors exceed a predetermined threshold level. In this embodiment, discriminators 33 may be of the type which utillzes a descrimination window whereby distinctions can be made in regard of the relative amplitudes of the incoming pulses from detectors 11. In this manner, pulse height analysis can be utilized to enable monitoring in a multiple labeling environment. The outputs of the discriminators are conducted to respective ones of coincidence units 35, each of which has two inputs and one output. One output pulse is issued by each coincidence unit when simultaneous input pulses are received. The outputs of the coincidence units are coincidence signals which are conducted to respective ones of counters 36.

In this embodiment, if signals from three or four discriminators are present simultaneously in the system, a majority coincidence unit 37 produces a pulse which cancels that event for all counters. In this embodiment, issuance of coincidence signals is provented by majority coincidence unit 37. Thus, only simultaneous pulses in exactly two discriminators will trigger a count in exactly one corresponding counter. Counters 36 are gated by an associated timer 39.

Figure 4:
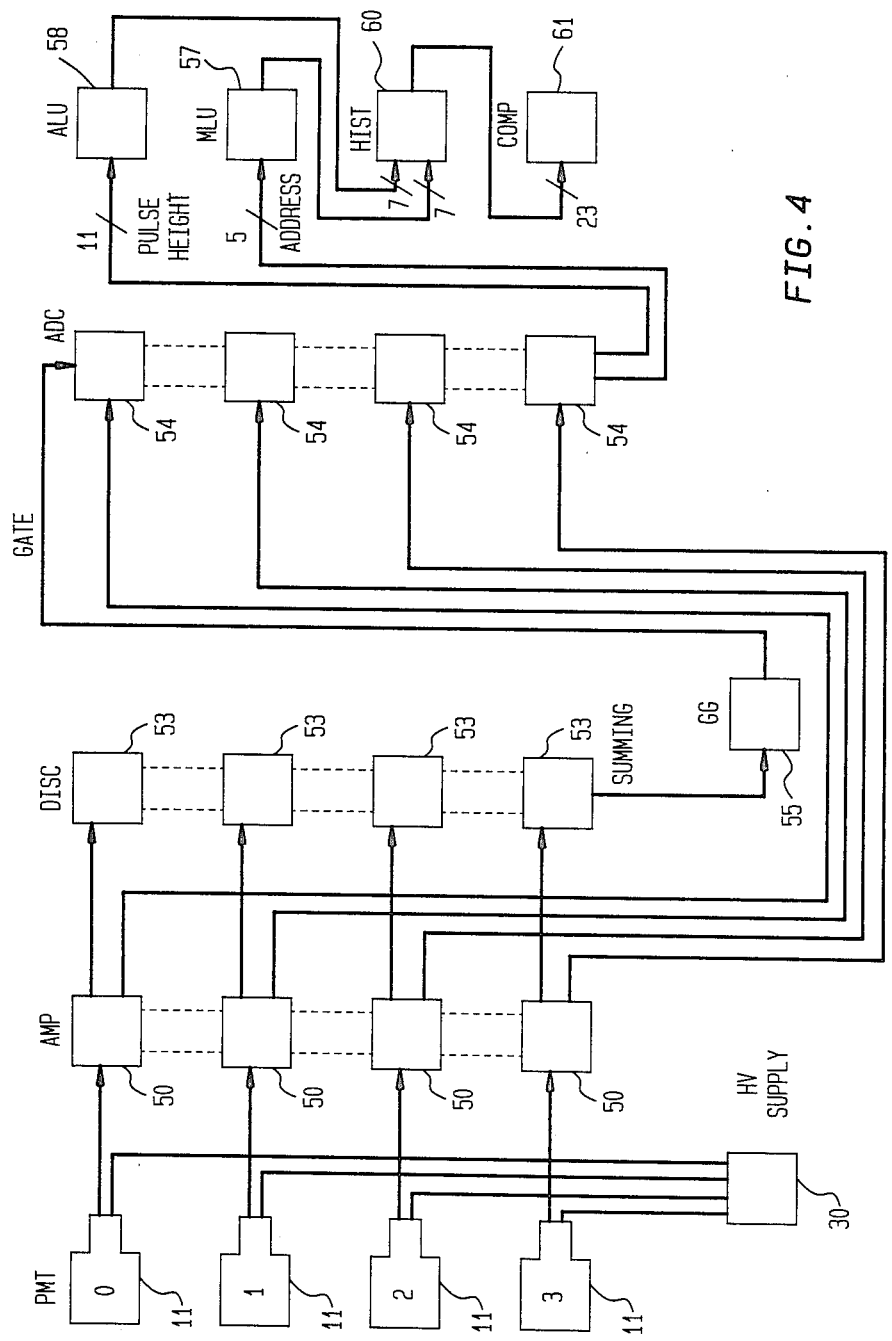
FIG. 4 is a block and line representation of a further illustrative embodiment of decoding circuitry.

FIG. 4 is a block and line representation of a further specific illustrative embodiment of decoding circuitry which operates to count the scintillation event. In this embodiment, each of detectors 11 is powered by a high voltage supply 30, in a manner which may be similar to that described hereinabove with respect to FIG. 3. The output of each detector is conducted to an associated one of amplifiers 50, each of which supplies an output signal to associated ones of discriminators 53 and analog-to-digital convertors 54.

The summing output of the discriminators triggers a gate generator 55 which produces at its output a pulse if two or more discriminators have fired. The gate generator output activates the analog-to-digital convertors which record a pulse height for each detector signal. If signals from exactly two detectors, a and b, are present a memory logic unit 57 records which pair (a,b) was activated. An arthmetic logic unit 58 calculates a sum, A, of the pulse heights of a and b. Both items of information are provided to a histogramming memory 60 which histograms each event (a,b,A). After histogramming memory 60 has accumulated data for a predetermined period of time, its contents are read by a computer 61. The computer processes the information received from the histogramming memory and identifies those items of data having pulse heights A which are appropriate to the particular isotope or isotopes being used in the system. Thus, the signal detected in the detectors are tested for simultaneity and total pulse height by the decoder system of FIG. 4. If the total pulse height is within the range appropriate for a preselected radioisotope, the count is recorded for the appropriate sample.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and descriptions in this disclosure are proffered to facilitate comprehension of the invention and should not be construed to limit the scope thereof.

What is claimed is:

1. An arrangement for monitoring scintillation events in each of a plurality of samples, the arrangement comprising:
   m sample-holding means, each for accommodating one of the samples, where $m \geq 5$;
   n sensor means for receiving endications of the scintillation events and producing responsive output electrical signals, where $n < m$;
   light guide means for coupling optically each of said sample-holding means to two of said sensor means; and
   coincidence-determining means for identifying a one of the samples in which a scintillation event occurred.

2. The arrangement of claim 1 wherein there is further provided discriminator means coupled to said sensor means for producing an incidence signal when a responsive output electrical signal has a magnitude within a predetermined range.

3. The arrangement of claim 1 wherein there is further provided event cancellation means for determining that output electrical signals have been issued simultaneously by a predetermined number of said sensor means, and conducting a responsive cancellation signal to said coincidence-determining means.

4. The arrangement of claim 3 wherein said predetermined number of said sensor means at least three.

5. The arrangement of claim 1 wherein there is provided counter means coupled to said coincidence-determining means for counting the scintillation events of each sample.

6. The arrangement of claim 5 wherein there is further provided timer means for gating said counter means.

7. A multiplexing system comprising:
   n sensors each having an input for receiving an input light signal and an output for producing an output electric signal responsive to said input light signal, where $n > 3$;
   m light-receiving means each for receiving a respective source light signal, where $n < m \leq (n/2)(n-1)$;
   light transport means for conducting said source light signal from each of said light-receiving means to said inputs of at least two of said sensors, whereby at least one of said sensors receives a plurality of said source light signals from a respectively associated plurality of said light-receiving means; and
   coincidence-dertermining means for producing a coincidence signal when a preselected plurality of said sensors issue respective output electric signals within a predetermined time period of one another.

8. A multiplexing system of claim 7 wherein there is further provided counter means for producing a numerical value responsive to siad coincidence signal.

9. The mutiplexing system of claim 7 wherein there is further provided threshold disriminator means having an input for receiving said output electric signal and an output for producing a discriminator signal when said output electric signal is within a range defined by a predetermined threshold magnitude.

10. The multiplexing system of claim 7 wherein said light-receiving means are adapted to receive a scintillant for producing said source light signal responsive to radioactivity.

11. The multiplexing system of claim 10 wherein said scintillant is a liquid contained in a vial.

12. The multipoexing system of claim 7 wherein there is further provided group monitoring means for disabling said coincidence-determining means when others of said preselected plurality of sensors issue respective output signals within said predetermined time period.

13. A method of monitoring scintillations events simultaneously in each of a plurality of scintillation samples, the method comprising the steps of:
   installing each of the scintillation samples in an associated one of a plurality of sample-holding means;
   consucting a light produced by the scintillation events in each of the scintillation samples to a respectively associated pair of at least four light sensors, there being fewer of said light sensors than said sample-holding means, whereby each of said light sensors is adapted to receive said light from at least three of said sample-holding means;
   measuring an output electric signal from each of said light sensors against a predetermined threshold magnitude;
   determining a coincidence of said output electric signals; and
   counting said coincidence signals to prodice a numerical value.

14. The method of claim 13 wherein prior to performing said step of measuring there is provided the further step of amplifying said output electric signals.

15. The method of claim 13 wherein said step of counting includes counting only ones of said output electric signals which have a magnitude greater than said predetermined threshold magnitude.

16. The method of claim 13 wherein said step of counting includes counting only ones of said output electric signals having a magnitude less than said predetermined threshold magnitude.

17. The method of claim 13 wherein said step of measuring is performed to determine whether said output electric signal has a magnitude within a predetermined range of magnitudes.

18. The method of claim 17 wherein said step of measuring is preformed in a discriminator.

19. the method of claim 13 wherein there is further provided the step of converting said output electric signal to a digital form.

* * * * *